US008014965B2

(12) United States Patent
Desbiens et al.

(10) Patent No.: US 8,014,965 B2
(45) Date of Patent: Sep. 6, 2011

(54) SPECTRAL ESTIMATION OF SPECTROMETERS TIME-SAMPLED SIGNALS USING FAST IMPLEMENTATION OF THE REVERSE NON-UNIFORM DISCRETE FOURIER TRANSFORM

(75) Inventors: Raphaël Desbiens, Beauport (CA); Henry L. Buijs, Sillery (CA)

(73) Assignee: ABB Bomen, Quebec (CA)

( * ) Notice: Subject to any disclaimer, the term of this patent is extended or adjusted under 35 U.S.C. 154(b) by 1163 days.

(21) Appl. No.: 11/708,880

(22) Filed: Feb. 21, 2007

(65) Prior Publication Data

US 2008/0198374 A1 Aug. 21, 2008

(51) Int. Cl.
*G01N 21/00* (2006.01)
*G06F 17/40* (2006.01)

(52) U.S. Cl. ............... 702/77; 702/66; 702/32; 356/451

(58) Field of Classification Search .................... 702/77, 702/66, 70, 71, 73, 28, 30–32
See application file for complete search history.

(56) References Cited

U.S. PATENT DOCUMENTS

| | | | | |
|---|---|---|---|---|
| 3,983,507 | A | * | 9/1976 | Tang et al. .................... 372/105 |
| 4,686,457 | A | * | 8/1987 | Banno ........................ 324/76.21 |
| 5,550,872 | A | * | 8/1996 | Liberti et al. ................. 375/347 |
| 5,777,736 | A | * | 7/1998 | Horton .......................... 356/456 |
| 5,914,780 | A |   | 6/1999 | Turner et al. |
| 5,923,422 | A |   | 7/1999 | Keens et al. |
| 5,963,322 | A | * | 10/1999 | Rapp et al. .................... 356/451 |
| 6,804,283 | B2 | * | 10/2004 | Scherer ...................... 372/50.21 |
| 6,865,408 | B1 |   | 3/2005 | Abbink et al. |
| 7,003,004 | B2 | * | 2/2006 | Rodin et al. ..................... 372/23 |
| 2005/0261560 | A1 |   | 11/2005 | Ridder et al. |

OTHER PUBLICATIONS

Liu, Q.H. and Tang, X.Y. Iterative algorithm for nonuniform inverse fast Fourier transform (NU-IFFT), Elecctronics Letters, v.34, n.20, 1913-1914 (Oct. 1998).*
Potts, D. and Steidl,G. "Fast summation at nonequispaced knots by NFFTs", SIAM J. Sci. Comput. 24, 2013-2037, (full paper ps,pdf), 2003.
James W. Brault, "New approach to high-precision Fourier transform spectrometer design", Applied Optics, vol. 35, No. 16, Jun. 1996, pp. 2891-2896.
John C. Brasunas and G. Mark Cushman, "Uniform time-sampling Fourier transform spectroscopy", Applied Optics, vol. 36, No. 10, Apr. 1997, pp. 2206-2210.
Hilary E. Snell, William B. Cook, and Paul B. Hays, "Multiplex Fabry-Perot Interferometer: II. Laboratory prototype", Applied Optics, vol. 34, No. 24, Aug. 1995, pp. 5268-5277.

(Continued)

*Primary Examiner* — Hal Wachsman
(74) *Attorney, Agent, or Firm* — Michael M. Rickin

(57) ABSTRACT

A spectrometric system has a primary channel with a signal waveform and a reference channel with a signal waveform. A digital representation of the primary signal waveform and a digital representation of the reference signal waveform to provide a digital output representing the primary signal at datum points synchronized with the reference signal are processed by computing the Fourier transform of the primary signal waveform and using a fast reverse non-uniform discrete Fourier Transform technique to compute the reverse non-uniform discrete Fourier transform of the Fourier transform of the primary signal waveform to provide the digital output representing the primary signal at datum points synchronized with the reference signal.

27 Claims, 13 Drawing Sheets

OTHER PUBLICATIONS

Simon Roy, Jerome Genest and Martin Chamberland, New Sampling Approach Suitable for Imaging Fourier Transform Spectrometers with Integrating Detector, Fourier Transform Spectroscopy and Hyperspectral Imaging and Sounding of the Environment on CD-ROM (The Optical Society of America, Washington, DC, 2007.

Husheng Yang, Peter R. Griffiths and Christopher J. Manning, "Improved Data Processing by Application of Brault's Method to Ultra-Rapid-Scan FT-IR Spectrometry", Applied Spectroscopy, vol. 56, No. 10, Oct. 2002, pp. 1281-1288.

Luca Palchetti and Davide Lastrucci, "Spectral noise due to sampling errors in Fourier-transform spectroscopy", Applied Optics, vol. 40, No. 19, Jul. 2001, pp. 3235-3243.

Naylor, D.A., Fulton, T.R., David, P.W., Chapman, I.M., Gom, B.G., Spencer, L.D., Linder, J.V., Nelson-Fitzpatrick, N.E., Tahic, M.K., and David, G.R., "Data processing pipeline for a time-sampled imaging Fourier transform spectrometer", Proc. SPIE, Imaging Spectrometry X 5546, 2004.

D. Potts, G. Steidl, and M. Tasche, "Fast Fourier transforms for nonequispaced data: A tutorial", in: Modern Sampling Theory: Mathematics and Applications, J.J. Benedetto and P. Ferreira (Eds.), Chapter 12, pp. 249-274, 2001.

A.J.W. Duijndam and M.A. Schonewille, "Non-uniform fast Fourier Transform", Geophysics, vol. 64, No. 2, Mar.-Apr. 1999, pp. 539-548.

A. Simon et al., "Data acquisition and interferogram data treatment in FT-IP spectrometers", Vibrational Spectroscopy 29 (2002) 97-101.

Christopher J. Manning et al., "FT-IR Interferogram Signal Processing for Uniform-Time Sampling", Proc. SPIE, vol. 4577, 127 (2002), Online Publication Date Apr. 8, 2003 SPIE Digital Library.

Brasunas et al, "Uniform time-sampling Fourier transform spectroscopy" Applied Optics/vol. 36, No. 10/Apr. 1, 1997.

Brault,"New approach to high-precision Fourier transformer spectrometer design" Applied Optics/vol. 35, No. 16/ Jun. 1, 1996.

Duijndam et al,"Nonuniform fast Fourier transform" Geophysics/ vol. 64, No. 2 (Mar.-Apr. 1999) p. 539-551, 6 Figs, 5 Tables.

Manning et al, "FT-IR Interferogram Signal Processing for Uniform-Time Sampling" Proceedings of SPIE—vol. 4577 Vibrational Spectroscopy-based Sensor Systems, Steven D. Christesen, Arthur J. Sedlacek III, Editors, Feb. 2002, pp. 127-134.

Naylor et al, "Data processing pipeline for a time-sampled imaging Fourier transform spectrometer" Proc. SPIE, Imaging Spectrometry X 5546, (2004). www.uleth.ca/ phy / naylor/.

Palchetti et al, "Spectral noise due to sampling errors in Fourier-transform spectroscopy" Applied Optics/vol. 40, No. 19/ Jul. 1, 2001.

Potts et al, "Fast Fourier transforms for nonequispaced data: A tutorial" in Modern Sampling Theory: Mathematics and Applications, J.J. Benedetto and P. Ferreira (Eds.), pp. 249-274, 2000.

Simon et al, "Data acquisition and interferogram data treatment in FT-IR spectrometers" Vibrational Spectroscopy 29 (2002) 97-101.

Snell et al, "Multiplex Fabry-Perot interferometer: 11. Laboratory prototype" Applied Optics /vol. 34, No. 2 Aug. 1995.

Yang et al, "Improved Data Processing by Application of Brault's Method to Ultra-Rapid-Scan FT-IR Spectrometry" Applied Spectroscopy vol. 56, No. 10 (2002).

Roy et al, "New Sampling Approach suitable for Imaging Fourier Transform Spectrometers with Integrating Detector" Centre d'optique, photonique et laser (COPL) Universite Laveal (Center for Optics, Photons and Lasers, Laval University), Quebec, Canada, GIK7P4 Feb. 2007.

* cited by examiner

SPECTRAL ESTIMATION OF SPECTROMETERS TIME-SAMPLED SIGNALS USING FAST IMPLEMENTATION OF THE REVERSE NON-UNIFORM DISCRETE FOURIER TRANSFORM

FIELD OF THE INVENTION

This invention generally relates to the field of spectrometer technology used for Mid IR, Near IR, Visible and UV light spectroscopy, and more specifically to the sampling of the spectrometer signal.

DESCRIPTION OF THE PRIOR ART

Spectrometer technology often relies on scanning through time in order to measure the spectrum of a light source or of its interaction with matter. For example, most Fourier transform spectrometers include an interferometer that modulates the incoming light beam with a scanning mechanism in order to measure the intensity of a varying light interference pattern with a detector. Afterwards, the spectrum of the light is estimated by applying the Fast Fourier Transform algorithm (FFT) to the measured signal. Other spectrometer configurations are based on a monochromator or a tunable laser source where the wavelength of the source is swept to measure the interaction of matter with the light emitted by the source, at various wavelengths.

The time-based spectrometers described above are different from spatial-based spectrometers where the spectrum is measured simultaneously for all wavelengths allowed. Such spatial-based spectrometers, like some configurations of dispersive spectrometers, make use of a detector array. In spatial-based spectrometers, spectral information is separated or modulated according to a spatial dimension of the spectrometer detector assembly, and not relative to the temporal dimension.

Many configurations of imaging spectrometers may be categorized as time-based spectrometers since the spatial dimensions of the detector array are related to the spatial information of the source or the scene, not to its spectral contents.

Modern time-based Fourier transform spectrometers rely on a spectral reference channel to calibrate the spectral scale of the measurements. Fourier transform spectrometers usually include a monochromatic reference source, such as a laser, that relates the variations of the scanning mechanism to the modulation of the light of the primary source or scene. In many configurations, the digitalization of the measured signal is triggered or synchronized with the reference channel in order to provide samples spaced evenly relative to the reference channel. For example, Michelson based Fourier transform spectrometers sample the signal at equally spaced displacements of the scanning mirror by referring to the modulation of the reference laser beam. The spectrum of the source is then directly estimated by the Fourier transform of the digitalized signal. Some tunable laser spectrometers also include a spectral reference channel such as a Fabry-Perot etalon that allows a stable and repeatable calibration of the spectral axis of the spectrometer.

Perturbations of the scanning mechanism preventing a constant scanning rate of the mechanism have been historically the primary concern addressed by the reference channel of Fourier transform spectrometers. These perturbations include vibrations, friction, shocks, linearity of the scanning mechanism drive or response, and thermal distortion of the mechanical structure. By triggering the digitalization of the measured signal with the reference channel, Fourier transform spectrometers have been successful in providing a highly stable spectral scale, which stability could be limited by the reference stability itself. For example, common HeNe laser sources used in Fourier transform spectrometers easily provide a spectral stability better than 1 ppm RMS over a few hours.

One classical implementation of the signal digitalization in Fourier transform spectrometers consists of triggering the analog-to-digital converter (ADC) by comparing the modulation of the reference HeNe laser with a threshold level. First, the laser signal is filtered with a high pass filter to remove the DC component of the modulation. Then the signal is passed through a comparator circuit that converts the sinusoidal signal into a square wave signal. The up and down transitions of the square wave signal correspond to the zero-crossings of the AC component of the laser modulation. Afterwards, the analog to digital conversion of the primary signal is triggered with the transitions of the square wave signal. The distance between two up transitions of the square wave signal corresponds to one wavelength of the HeNe laser, which is typically about 632 nm. Triggering the ADC with the up transitions ensures that the primary signal is sampled evenly every 632 nm of optical path difference (OPD).

In order to trigger an ADC with the reference signal, a Successive Approximation Register (SAR) type ADC is required. These ADCs typically use a sample-and-hold circuit to provide the digital representation of a voltage at precisely the requested time of sampling. Current commercial SAR type ADCs allow high sampling rates, but with a resolution typically limited to 18 bits.

During the mid 1990s, a new technique of digitizing was introduced in the domain of high performance audio. It consisted of a Sigma-Delta approach that builds the digital reading of a voltage by repeatedly digitizing a voltage at low resolution and high rate. It is in fact an integrating technique and it can currently provide a resolution of up to 24 bits. However, Sigma-Delta ADCs only work effectively at a constant rate of digitizing, and cannot be triggered with the Fourier transform spectrometer reference signal. The use of a 24-bit Sigma-Delta ADC can increase the dynamic range of spectrometers, reducing the quantification errors due to the digitalization of the signal. The low cost of Sigma-Delta ADCs is another advantage of this technology.

A technique of acquiring digital interferogram signals from Michelson type Fourier transform spectrometers with the Sigma-Delta ADC and using a constant digitizing clock rate is described by James W. Brault, in "New approach to high-precision Fourier transform spectrometer design", *Applied Optics*, vol. 35, no. 16, June 1996, pp. 2891-2896 ("Brault"). Given the variations in scanning velocity, the samples are not uniformly spaced along the optical path difference (OPD) axis and therefore are not suitable for direct numerical Fourier transformation. Brault's technique determines precisely where each sample occurs on the OPD axis and computes a new interferogram by interpolation such that samples are evenly spaced along the OPD axis. Brault essentially used a timing circuit in conjunction with the square wave derived from the laser reference signal to determine the precise OPD positions of the initially sampled points. The spectrum of the source is obtained by a regular Fourier transform of the interpolated samples corresponding to an equally spaced OPD grid.

The main problem encountered with Brault's algorithm is the combination of the interpolation function and the scanning perturbations that cause variations of the OPD interval between the times at which the samples of the signal are acquired. Since the interpolation is performed in the time domain to estimate a spatially sampled interferogram, the interpolation function will induce errors on the interferogram due to these speed fluctuations caused by the perturbations. This problem is described by Brault in the above-identified reference.

The solution Brault proposed was to adapt the interpolation function according to an estimate of the scanning mirror instantaneous speed. This second order correction is implemented by a pre-computation of the interpolation function for a given speed fluctuation range. The algorithm proposed by Brault necessitates a significant oversampling of the interferogram in order to achieve acceptable interpolation accuracy, which increases the computational time required to compute the final spectrum. It requires also a large memory to store the pre-computed interpolation functions. The second order correction has a limited accuracy for high perturbation levels.

U.S. Pat. No. 5,914,780 ("the '780 Patent") assigned to Perkin-Elmer, issued on Jun. 22, 1999 from as is shown on the cover page of the '780 Patent an application filed at the United States Patent and Trademark Office on Oct. 8, 1997 as Ser. No. 08/946,779 that claims priority from an application filed at the European Patent Office on Oct. 9, 1996 as Ser. No. 96307360 ("EPO Priority Application") describes a refinement of Brault's technique. The technique of the '780 Patent extends Brault's approach to include digitizing the reference signal with a second fixed frequency ADC. The '780 Patent describes variations of the implementation as well as a number of interpolation techniques applied in order to prepare the interferogram for Fourier transformation. The interpolation techniques described therein include linear, cubic or higher order fit, and polyphase filters. These interpolation approaches have limitations similar to Brault's algorithm, requiring significant oversampling of the interferogram.

In "Uniform time-sampling Fourier transform spectroscopy", Applied Optics, vol. 36, no. 10, Apr. 1997, pp. 2206-2210, published shortly after the priority patent application was filed for the '780 Patent, John C. Brasunas and Mark G. Cushman describe the same time-sampling technique as the one described in the '780 Patent. They interpolated both waveforms by zero-padding their spectra (Fourier interpolation) in order to increase the time samples by a factor of 32, and then they selected the samples nearest to the positions of a regular grid related to metrology zero-crossings. Fourier interpolation by such a large factor is a computationally expensive operation. The selection of the interpolated sample nearest to the desired sampling time was also suggested in Brault's paper.

Hilary E. Snell, William B. Cook, and Paul B. Hays, in "Multiplex Fabry-Perot Interferometer: II. Laboratory prototype", Applied Optics, Vol. 34, no. 24, August 1995, pp. 5268-5277, reported the use of the time-sampling technique described in the '780 patent but with a Fabry-Perot based Fourier transform spectrometer. The interpolation of the signals on a regular spatial grid was performed with a spline-fitting routine. The main difference between the content of this paper and the '780 patent resides in the interferometer type.

Simon Roy, Jerome Genest and Martin Chamberland, in "New Sampling Approach Suitable for Imaging Fourier Transform Spectrometers with Integrating Detector," in Fourier Transform Spectroscopy and Hyperspectral Imaging and Sounding of the Environment on CD-ROM (The Optical Society of America, Washington, D.C., 2007), proposed a sampling method for use with integrating cameras inspired from Brault method. The approach consists of an imaging Fourier transform spectrometer where the acquisition of the camera is triggered at the zero-crossing position of the reference signal, and where the times of the zero-crossings are recorded. Then a filter bank is used to interpolate the signal at the positions where the samples were acquired by the camera, which positions are different from the positions of the zero-crossings due to electronics delay, to the speed fluctuations of the scanning mechanism, and to the integration time of the camera. The filter bank takes into account the speed of the scanning mechanism similarly to the method proposed by Brault. This method proposed by Roy et al. is a time sampling method where the samples are not acquired uniformly in time.

Husheng Yang, Peter R. Griffiths, and Christopher J. Manning, in "Improved Data Processing by Application of Brault's Method to Ultra-Rapid-Scan FT-IR Spectrometry", Applied Spectroscopy, vol. 56, no. 10, October 2002, pp. 1281-1288, implemented Brault's method for a rapid scanning Fourier transform spectrometer. They compared the accuracy and computational time of Brault's processing with cubic polynomial interpolation and Fourier interpolation. In "Spectral noise due to sampling errors in Fourier-transform spectroscopy", Applied Optics, vol. 40, no. 19, July 2001, pp. 3235-3243, Luca Palchetti and Davide Lastrucci compared the accuracy of Brault's time-sampling approach with the uniform OPD sampling that is commonly used in Fourier transform spectrometers.

Naylor, D. A., Fulton, T. R., Davis, P. W., Chapman, I. M., Gom, B. G., Spencer, L. D., Lindner, J. V., Nelson-Fitzpatrick, N. E., Tahic, M. K., and Davis, G. R., in "Data processing pipeline for a time-sampled imaging Fourier transform spectrometer", Proc. SPIE, Imaging Spectrometry X 5546, 2004, implemented Brault's sampling technique for an imaging Fourier transform spectrometer. They tested various interpolation functions to reconstruct the interferogram, based on Brault's processing algorithm as well as on cubic spline interpolation. They also implemented iterative algorithms to solve the resampling problem when described as an inverse problem.

Iterative algorithms generally require computing the non-uniform discrete Fourier Transform (NDFT) and the reverse NDFT many times to converge towards the solution. Therefore, a fast version of the NDFT algorithm developed by D. Potts, G. Steidl, and M. Tasche ("Potts et al.), and described by them in "Fast Fourier transforms for nonequispaced data: A tutorial", in: Modern Sampling Theory: Mathematics and Applications, J.J. Benedetto and P. Ferreira (Eds.), Chapter 12, pp 249-274, published in 2001, and called NFFT and reverse NFFT, was implemented within the iterative algorithms.

The inverse problem linked to non-uniform sampling is conceptually different as compared to the interpolation algorithms. The uniform time samples are not spaced evenly relative to the reference channel. The inverse problem will try to find a spectrum vector $S_k$ with a given regularly spaced spectral grid that will give back the samples $y(x_j)$ measured on grid $x_j = x(t_j)$, which is non-uniform relative to the reference channel and associated with sampling times $t_j$, when performing the reverse non-uniform discrete Fourier transform:

$$y(x_j) = \sum_{k=-K}^{K-1} S_k e^{i2\pi k x_j / K}, \; j = 1, \ldots, N$$

2K evenly spaced spectral points and N measured samples are considered in this equation. The NDFT and reverse NDFT are not unitary operators and cannot be used to solve directly this problem. There are many iterative algorithms that were developed to solve inverse problems. These algorithms require significant computational efforts and are not preferred for embedded computing. Iterative solutions may also require a number of iterations that is dependent on the input signal characteristic to converge to a given accuracy target. Therefore the computation time required may vary as a function of the perturbation level. Also, the various iterative algorithms usually do not guarantee convergence, and some measurements may need to be rejected.

Various implementations of Brault's time-sampling algorithm have been reported in a number of patents and applications. U.S. Pat. No. 5,923,422, describes a method to characterize the preamplifier and detector frequency response. This characterization is useful for the implementation of Brault's time-sampling technique, which allows compensating for the frequency response of the acquisition module and reduces the errors induced by the perturbations of the scanning mechanism. U.S. Pat. No. 5,963,322 describes the implementation of a switching power supply for the acquisition electronics of an optical spectrometer, wherein the switching supply is synchronized with the ADC sampling clock used for the uniform time-sampling technique. This implementation reduces significantly the noise in the measurements introduced by a switching power supply. An FTIR spectrometer based on Brault's time-sampling technique has also been described in patents and published applications related to biomedical applications such as, for example, "Noninvasive determination of alcohol in tissue", U.S. Patent Application Publication No. 20050261560, and "System for non-invasive measurement of glucose in humans", U.S. Pat. No. 6,865,408.

As described above, Brault's idea is to resample a regularly time-sampled interferogram on the irregular times corresponding to an equally spaced reference grid, using the Dirichlet kernel (or cardinal sine function), which is the ideal reconstruction function associated with discrete Fourier transforms. Since it is very time-consuming and unpractical to make a direct Dirichlet kernel interpolation with non-evenly spaced vectors, the interpolation kernel is usually truncated to reduce its span. This truncation introduces errors by itself and also increases the errors due to the scanning perturbations.

The solution proposed by Brault is to apodize the truncated kernel with a window function and to adjust the kernel width according to the local speed around the interpolated sample. This solution is a second order correction. Therefore the accuracy of the algorithm is limited to relatively small speed fluctuations. The computation of the interpolation function is still computationally expensive since it is usually based on an apodized and truncated Dirichlet kernel, and is not well adapted for real-time processing. Thus, the algorithm requires a larger amount of memory to stock the pre-computed interpolation function for various time intervals and scanning velocities.

The solution of the present invention is to make a proper Dirichlet kernel interpolation on an irregular grid with a fast algorithm that solves the problems associated with the interpolation function and the scanning perturbations of a spectrometer. This new algorithm makes use of the fast reverse non-uniform discrete Fourier transform (reverse NFFT) developed by Potts et al. in combination with the time sampling methods presented by Brault and others, in a manner that is not taught, disclosed or even suggested by Potts et al. alone or in any combination with any of the other prior art cited herein. The reverse NFFT algorithm approximates the non-uniform discrete Fourier transform (NDFT) of a uniformly sampled signal using an FFT algorithm.

SUMMARY OF THE INVENTION

A spectrometric system comprises a spectrometer and a processing device. The spectrometer comprises:
a primary channel that provides a primary channel waveform; and
a reference channel that provides a reference channel waveform;
the processing device adapted to process a digital representation of the primary channel waveform and a digital representation of the reference channel waveform to provide a digital output representing the primary channel waveform at datum points synchronized with the reference channel waveform. The processing device:
computing the Fourier transform of the primary channel waveform; and using a fast reverse non-uniform discrete Fourier Transform technique to compute the reverse non-uniform discrete Fourier transform of the Fourier transform of the primary channel waveform to provide the digital output representing the primary channel waveform at datum points synchronized with the reference channel waveform.

A spectrometric system comprises a spectrometer and a computing device. The spectrometer comprises:
a primary channel that provides a primary channel waveform; and
a reference channel that provides a reference channel waveform;
the computing device having therein program code usable by the computing device for processing a digital representation of the primary channel waveform and a digital representation of the reference channel waveform to provide a digital output representing the primary channel waveform at datum points synchronized with the reference channel signal waveform. The program code comprising:
code configured to compute the Fourier transform of the primary channel waveform; and code configured to use a fast reverse non-uniform discrete Fourier Transform technique to compute the reverse non-uniform discrete Fourier transform of the Fourier transform of the primary channel waveform to provide the digital output representing the primary channel waveform at datum points synchronized with the reference channel waveform.

A computer product for processing a digital representation of a signal waveform of a primary channel of a spectrometric system and a digital representation of a signal waveform of a reference channel of the system to provide a digital output representing the primary signal waveform at datum points synchronized with the reference signal waveform. The computer product comprising:
a processor;
computer usable program code stored on a non-transitory tangible computer readable media which when executed by the processor performs computing the Fourier transform of the primary signal waveform; and
computer usable program code stored on said non-transitory tangible computer readable media which when executed by the processor performs using a fast reverse non-uniform discrete Fourier Transform technique to compute the reverse non-uniform discrete Fourier transform of the Fourier transform of the primary signal waveform to provide the digital output representing the primary signal waveform at datum points synchronized with the reference signal waveform.

DETAILED DESCRIPTION

Figure 1:
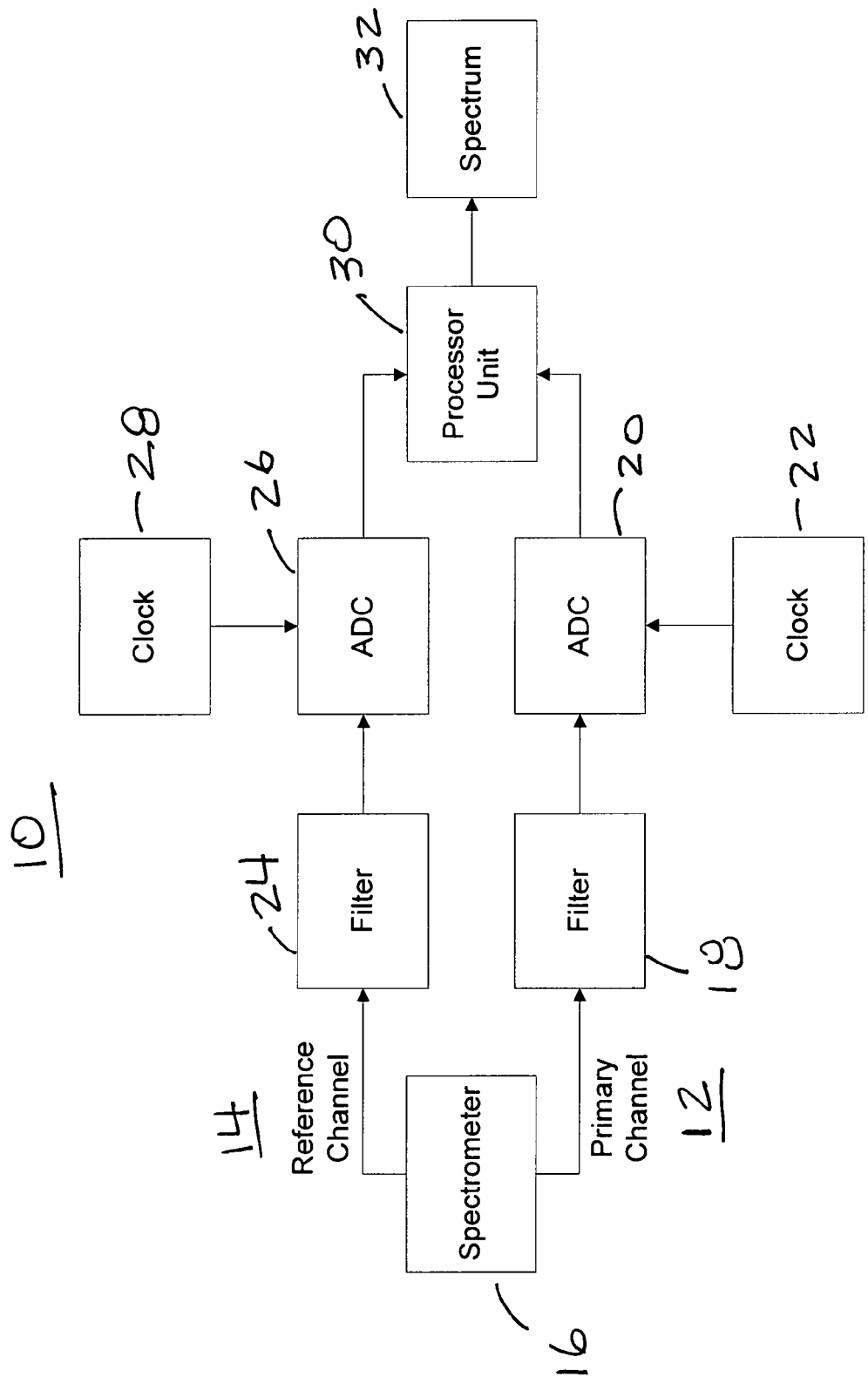
FIG. 1 shows a block diagram of a spectrometric system in which the digital representation of the spectral reference channel is provided by an analog to digital converter at a fixed sampling rate.

The present invention applies to time-based spectrometers with a spectral reference channel. Time-based spectrometers include Fourier transform type spectrometers with their various interferometer types, such as a Michelson type interferometer, a Fabry-Perot type interferometer, a Martin-Puplett type interferometer or a Mach-Zehnder type interferometer. Time-based spectrometers also include wavelength scanning type spectrometers such as monochromator type spectrometers and tunable laser type spectrometers. The spectral reference channel includes a monochromatic source such as a laser source or a filtered emission gas lamp. It could also include etalons, such as Fabry-Perot etalons, in wavelength scanning type spectrometers.

In this invention, the primary channel of the time-based spectrometer, which contains the desired spectral information, is sampled at a fixed sampling rate with an analog-to-digital converter. In the preferred embodiment, the analog-to-digital converter is a successive approximation analog-to-digital converter including a sigma-delta modulator.

The spectrometric system must provide a digital representation of the spectral reference channel. The digital representation of the spectral reference channel may consist, as described below in details with reference to FIG. 1, of a digitalized waveform of the reference channel at a fixed sampling rate with an analog-to-digital converter or may consist, as described below in details with reference to FIG. 2, of timing information synchronized with the reference signal.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 2:
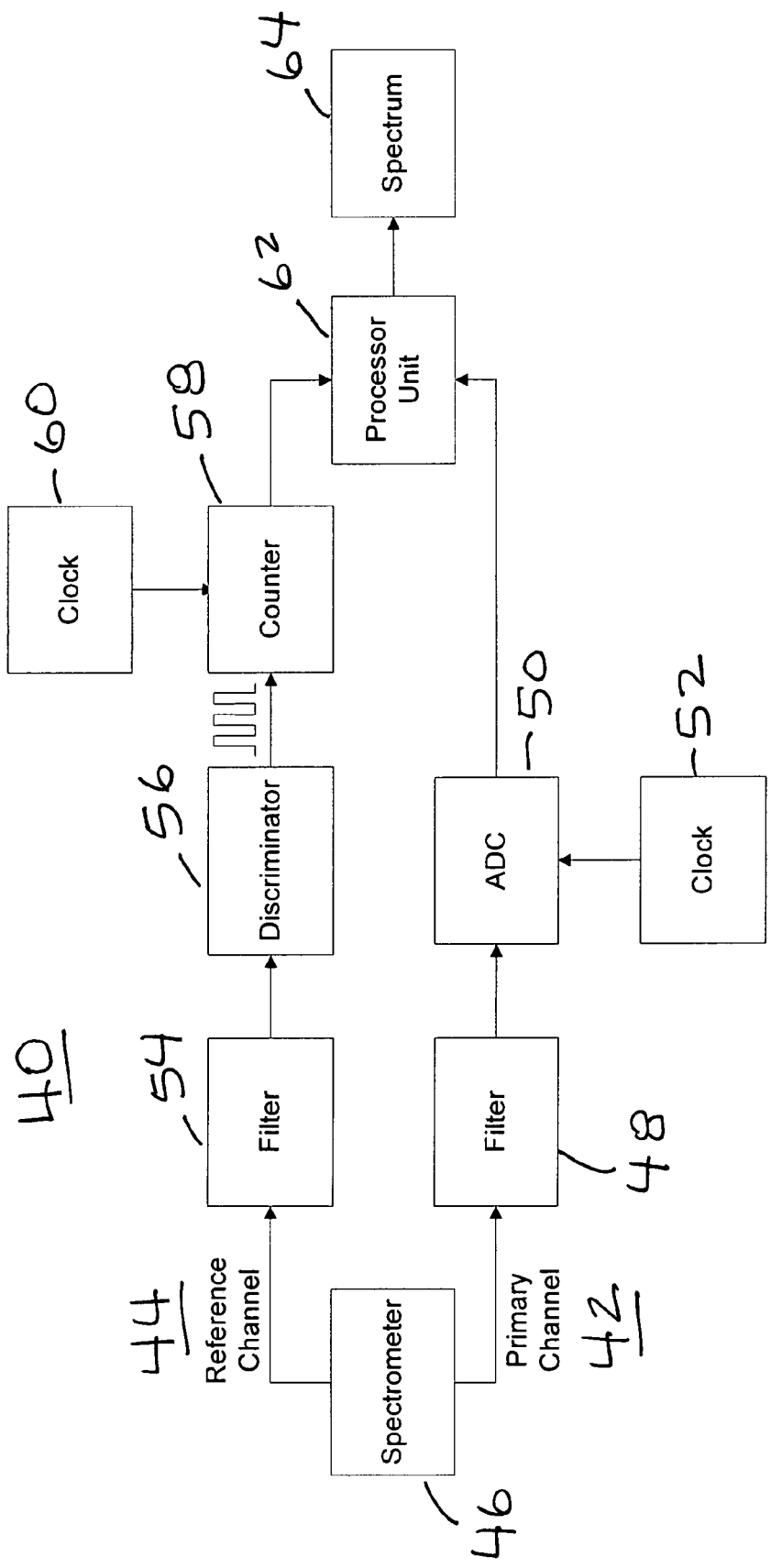
FIG. 2 shows a block diagram of a spectrometric system in which the digital representation of the spectral reference channel consists of the timing information provided by a counter.

Referring now to FIGS. 1 and 2, there are shown in each figure a spectrometric system 10 and 40, respectively, with a primary channel 12 and 42 and a reference channel 14 and 44, respectively. The primary channel 12 of the spectrometric system 10 shown in FIG. 1 is identical to the primary channel 42 of the spectrometric system 40 shown in FIG. 2. The spectrometric systems 10 and 40 each have a spectrometer 16 and 46, respectively, which has detectors for each of the associated primary and reference channels, and a spectral reference. Each primary channel 12 and 42 has a filter 18 and 48, respectively, and an analog to digital converter (ADC) 20 and 50, respectively, with an input from a clock 22 and 52, respectively, which function together to sample the desired spectral information at a fixed sampling rate.

The reference channel 14 of the spectrometric system 10 shown in FIG. 1 includes a filter 24, and an ADC 26 with an input from clock 28 functioning together to provide a digital representation of the spectral reference channel 14 at a fixed sampling rate. The frequency of the signal supplied from clock 28 to the analog-to-digital converter 26 of the reference channel 14 may be equal to or different from the frequency of the signal supplied from clock 22 to the analog-to-digital converter 20 of the primary channel 12.

The reference channel 44 of the spectrometer 40 shown in FIG. 2 includes a filter 54, a discriminator 56, and a counter 58 with an input from a clock 60. The counter 58 counts the number of transitions of the clock signal 60 between the times of two successive reference positions, for example, the zero-crossings of the reference signal. The filter 54, discriminator 56 and counter 58 function together to provide a digital representation of the reference signal that consists of timing information synchronized with the reference signal, where the timing information is some or all of the zero-crossing times of the reference signal, or the time intervals between the zero-crossing times of the reference signal. The digital representation of the spectral reference channel may also consist of some or all of the times where the reference signal crosses a predetermined threshold level.

As shown in FIGS. 1 and 2, both spectrometric systems 10 and 40 include a processor unit 30 and 62, respectively, which is used to compute the spectrum of the light beam from the primary channel waveform and from the digital representation of the reference signal. As is described in more detail below in connection with FIG. 4, the processor unit 30 and 62, respectively, makes that computation by performing the steps of the time sampling algorithm 400 of the present invention.

Figure 4:
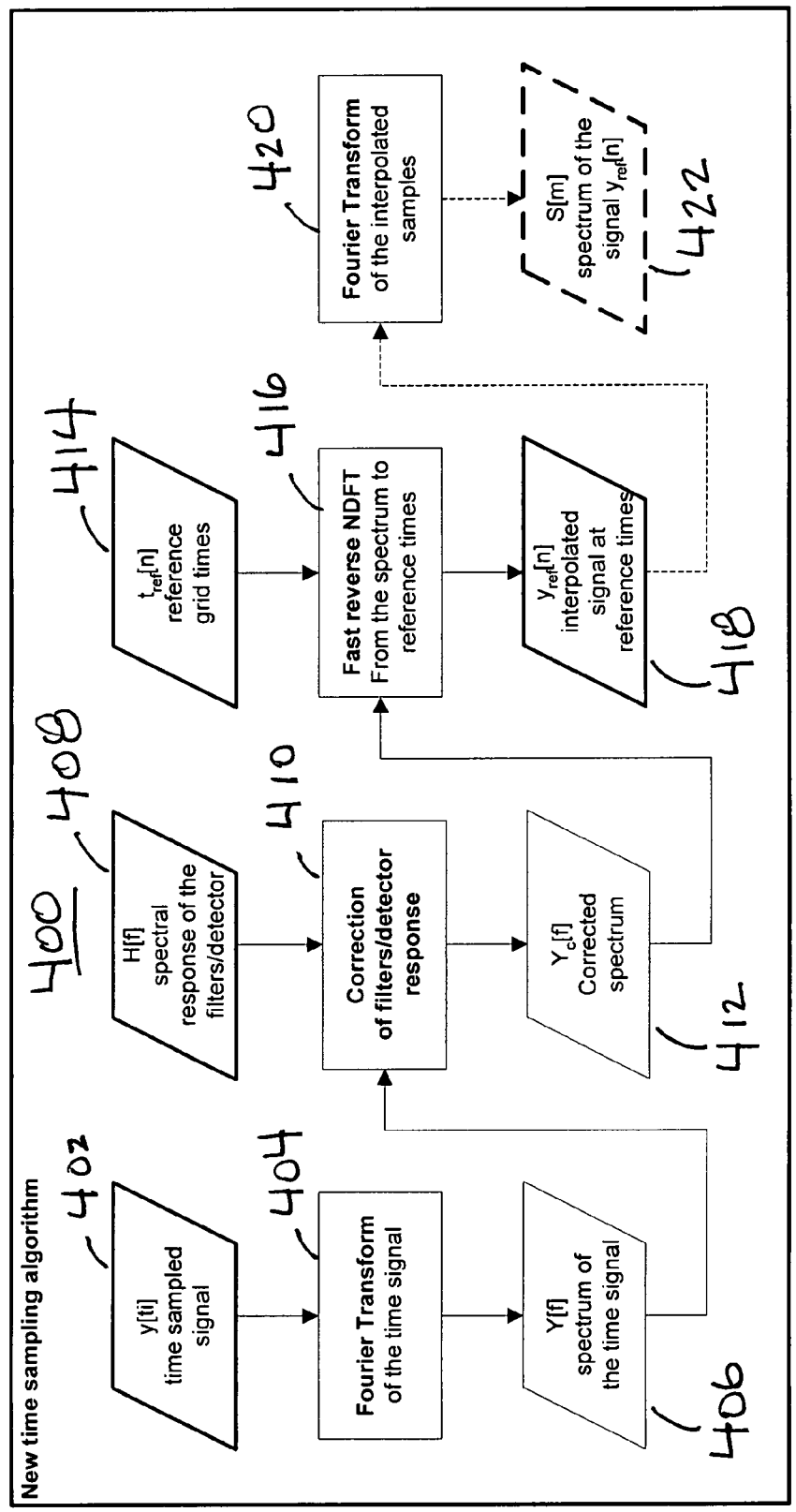
FIG. 4 shows, in a flowchart form, the steps performed in the time sampling method of the present invention.

The first step 404 in the method 400 shown in FIG. 4 consists of computing the Fourier transform of the regularly time-sampled signal 402, that is the output of the primary channels 12 and 42, respectively, of FIGS. 1 and 2, with the FFT algorithm to give the spectrum 406, Y[f], of the time signal. Since the computational time of the FFT algorithm is dependent on the vector length and its decomposition into prime factors, the length of the initial time-sampled vector can be increased with zero values in order to use more efficient FFT algorithms. The operation of adding zero values to a vector before computing its Fourier transform is known as zero-padding.

The second step 410 of the algorithm 400 is to obtain, if required, a corrected spectrum $Y_c[f]$ 412, by removing from the computed spectrum Y[f] of the time signal 406, the complex spectral response H[f] of the filters and the detector 408 by dividing the vector that results from the FFT computed at the first step 404 with their spectral response. For imaging spectrometers, the spectral response can be the frequency response related to the integration time of the detector array. This second step 410 can be omitted in some implementations of the invention, when the spectral response of the filters and detector is unknown, or when it is determined that the spectral response does not contain spectral features that could increase the errors due to the perturbations of the scanning mechanism. To make this determination, an analysis has to be made of the impact of a given spectral response and/or a given speed fluctuation level on the overall error on the spectrum of the measured signal. This determination depends on which error contributor dominates the performances of the system, and on the acceptable error level for a given application.

The third step 416 consists in computing the reverse non-uniform discrete Fourier transform using a fast reverse NDFT algorithm on a pre-computed non-uniform time grid 414 corresponding to a regularly spaced reference grid (datum points) to obtain the interpolated signal at reference times 418. As previously described, Potts et al. developed a reverse NFFT algorithm aimed at approximating the reverse non-uniform discrete Fourier transform (reverse NDFT) of a uniformly sampled signal using an FFT algorithm. One implementation of the reverse NFFT algorithm consists of dividing a regularly sampled signal by the inverse Fourier transform of an interpolation function, then computing the Fourier transform of the resulting vector, and resampling the spectrum on a given non-uniform grid 414 with the interpolation function. The interpolation function is optimized to reduce both the span of the interpolation function in the interpolating domain, and the residual errors resulting from the aliasing of the interpolation function in the Fourier domain.

Figure 3A:
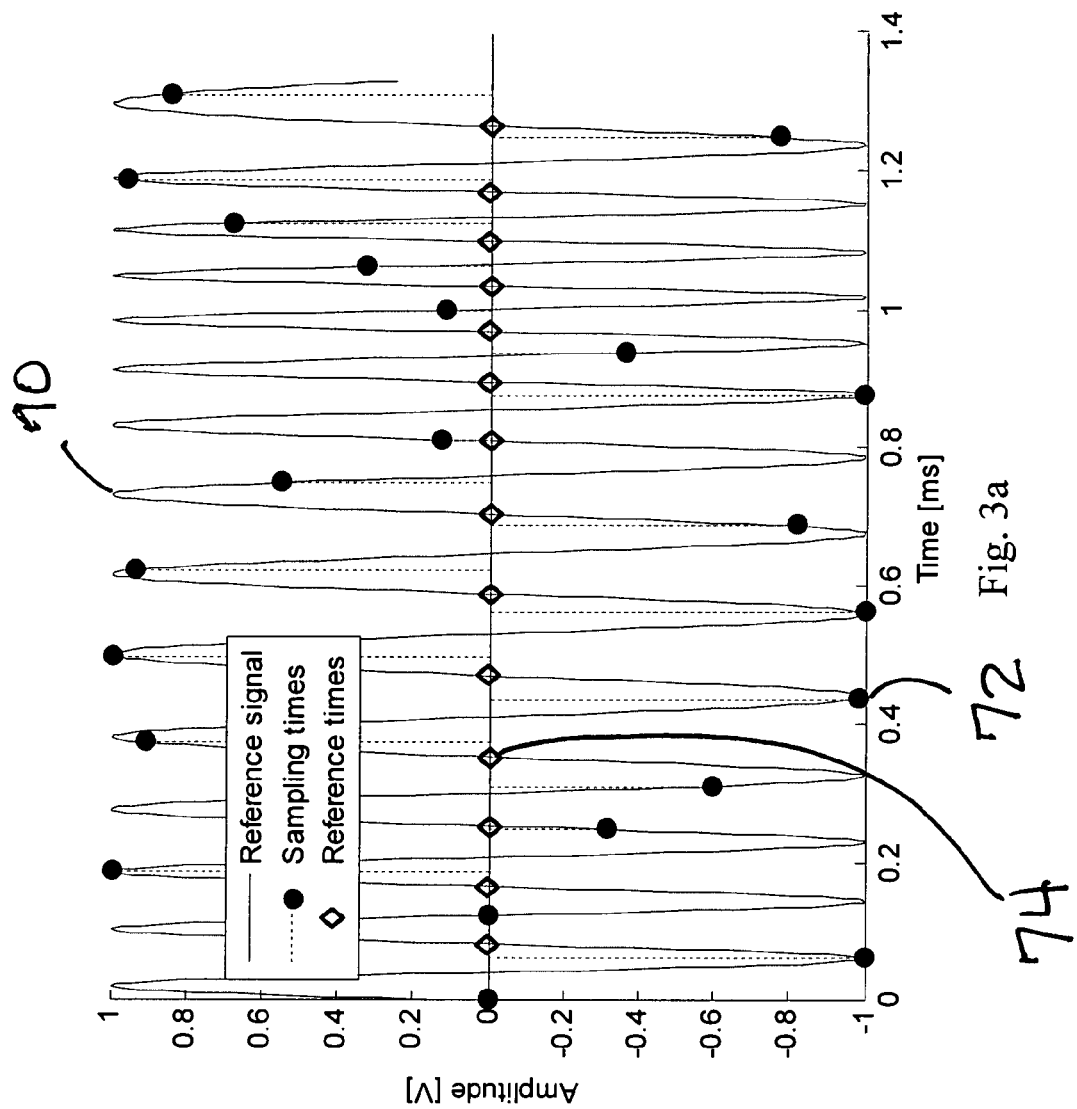
FIGS. 3a, 3b and 3c show, respectively, the reference signal and reference times versus the primary signal sampling times, the times corresponding to a uniform reference grid, and the uniformly time-sampled signal and interpolated samples.
Figure 3B:
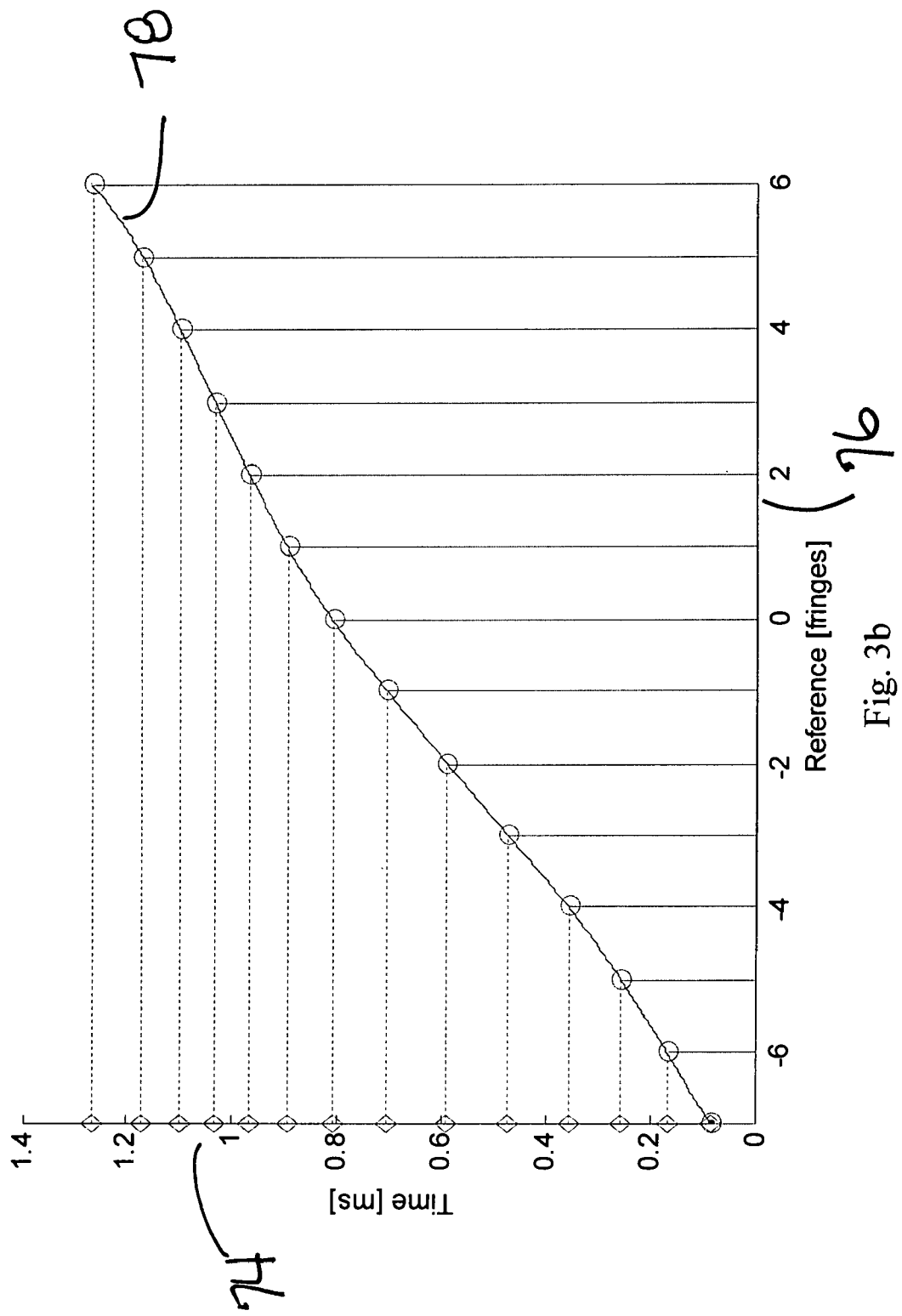

One method for the computation of the non-uniform time grid corresponding to a regularly spaced reference grid, for Fourier transform type spectrometers, is illustrated in FIGS. 3a and 3b. FIG. 3a shows the reference channel signal 70 as a function of time. The scanning of the spectrometers 16 and 46 are not linear due to perturbations, which causes, as is shown in FIG. 3a, the instantaneous frequency of the reference signal 70 to change with time. The sampling times of the primary channel at fixed time intervals, and the zero-crossing times of the reference signal are also illustrated on this figure at 72 and 74, respectively. The zero-crossing times 74 of the reference signal constitute the digital representation of the spectral reference channel.

In FIG. 3b, the zero-crossing times 74 of the reference signal 70 are plotted 78 against the position of the zero-crossings on the reference axis 76 to provide the relationship between time and position. If a reference grid different from the reference grid provided by the zero-crossings position is required, an interpolation such as a spline or other polynomial interpolation could be performed to compute the desired sampling times associated with the desired reference grid.

Figure 3C:
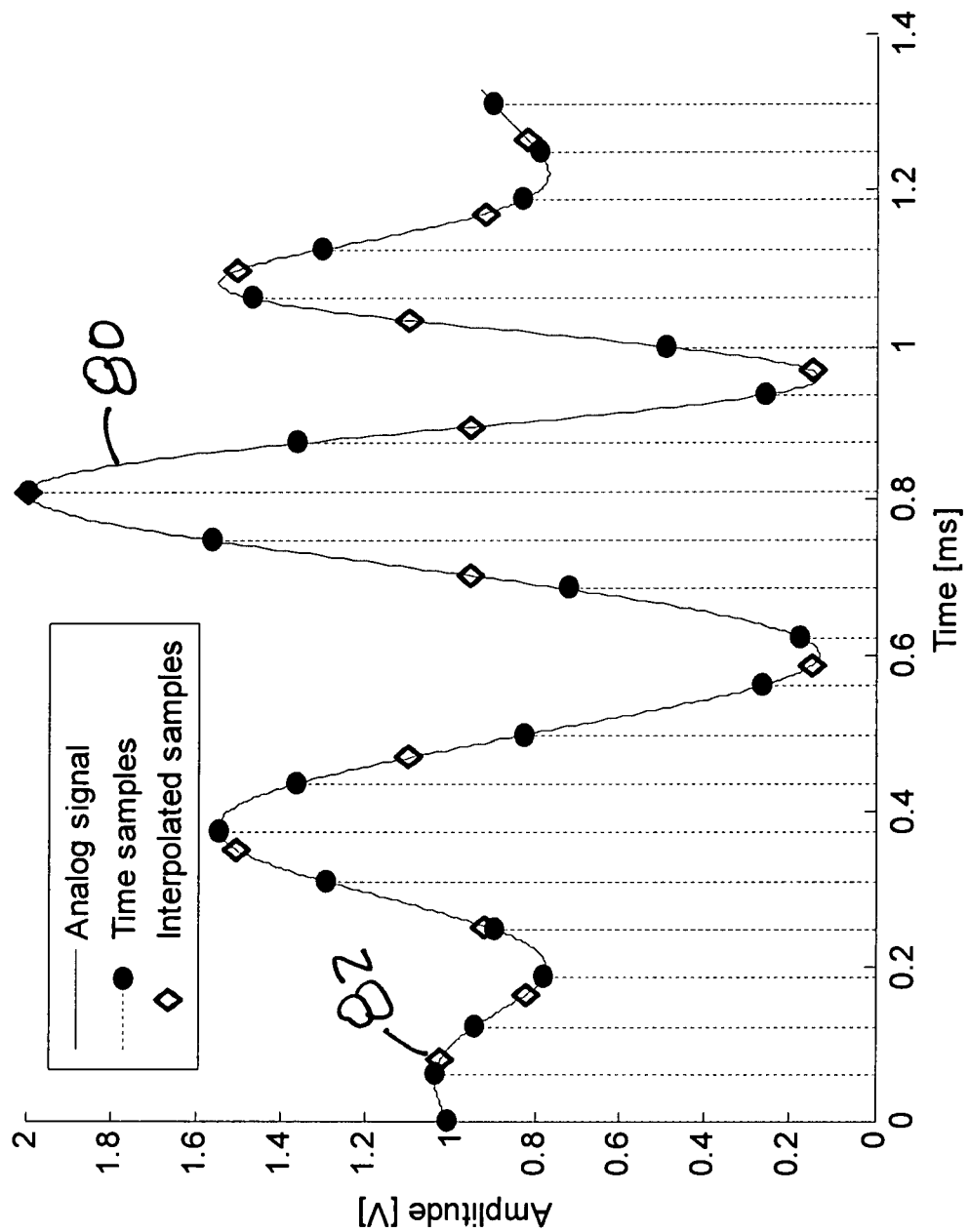

The interpolated signal 80 is shown in FIG. 3c where diamonds 82 are the interpolated samples of the primary signal at zero-crossings times from FIG. 3b. As can be appreciated from FIG. 3a, the original sampling 72 of the primary channel is uniform in time. Since, however, it is desired to have a uniform position grid and not a uniform time grid the samples are resampled as described above to obtain the uniform position grid.

Figure 5:
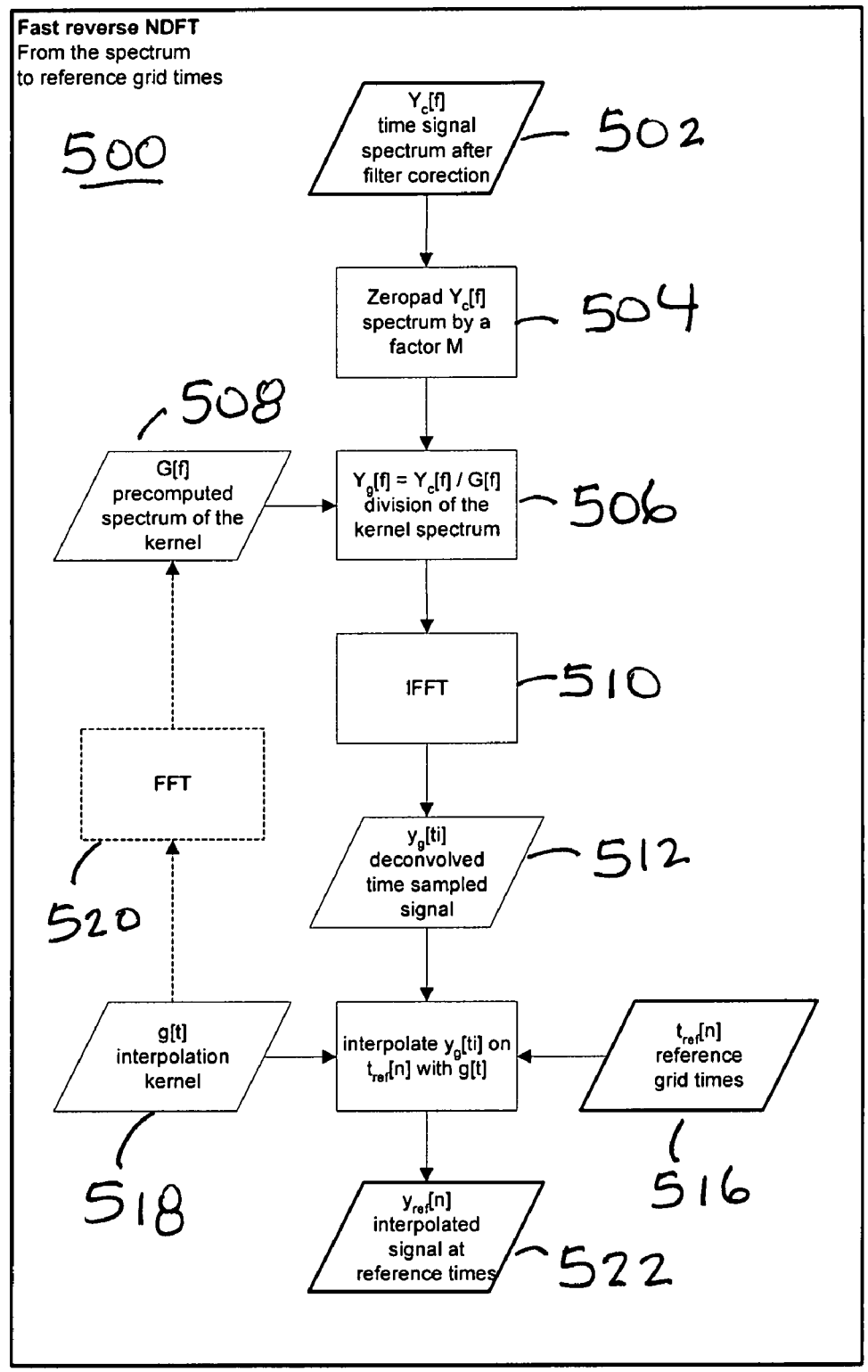
FIG. 5 shows, in a flowchart form, the embodiment of the fast reverse non-uniform discrete Fourier transform (NFTT) algorithm used in the present invention.

FIG. 5 shows the preferred implementation 500 (reverse NFFT) of the fast reverse non-uniform discrete Fourier transform algorithm, 416 of FIG. 4, in this invention. The end result of the algorithm 500 is the interpolated signal 522 at reference times 516, which is identical to 418 of FIG. 4.

Figure 7:
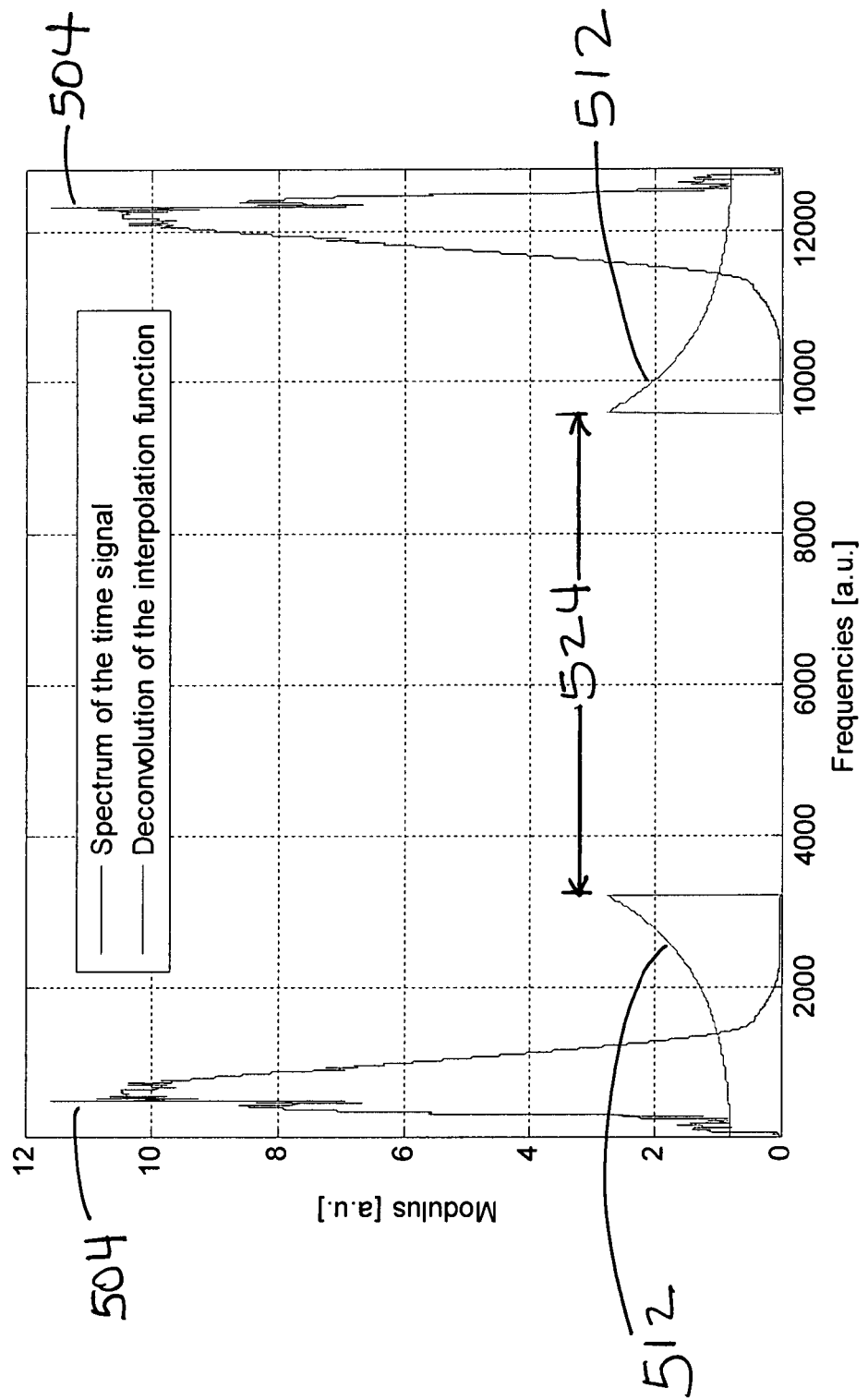
FIG. 7 shows the spectrum of the time signal and the inverse of the spectrum of the interpolation function for the reverse NFFT algorithm.

Zero-padding of the spectrum: The first step of the reverse NFFT algorithm 500 is to zero-pad by a factor of M in step 504 the time signal spectrum after filter correction ($Y_c[f]$) 502, which is identical to 412 of FIG. 4. The zero-padded time signal spectrum $Y_c[f]$ 504 is shown in FIG. 7. Similarly to the NuFFT algorithm described by A. J. W. Duijndam and M. A. Schonewille ("Duijndam"), in "Non-uniform fast Fourier Transform", *Geophysics*, vol. 64, no. 2, March-April 1999, pp. 539-551, the interpolation function is related to an oversampling factor. This oversampling factor is preferable to ensure that the aliasing of the sidelobes of the interpolation function spectrum is minimized in the spectral region of the signal. The interpolation functions described by Duijndam et al. are optimized for an oversampling factor of 2. The oversampling factor allows also reducing the span of the interpolation function in the time domain. Furthermore, increasing the vector length by 2 maintains the efficiency of the FFT algorithm. Note that zero-padding increasing the length of a vector by a power of 2 corresponds to a uniform Dirichlet interpolation of the time signal by adding interpolated samples in-between original measured samples. The original samples are not modified by the zero-padding. Zero-padding could also be omitted or implemented with the addition of any number of zero values.

Figure 6:
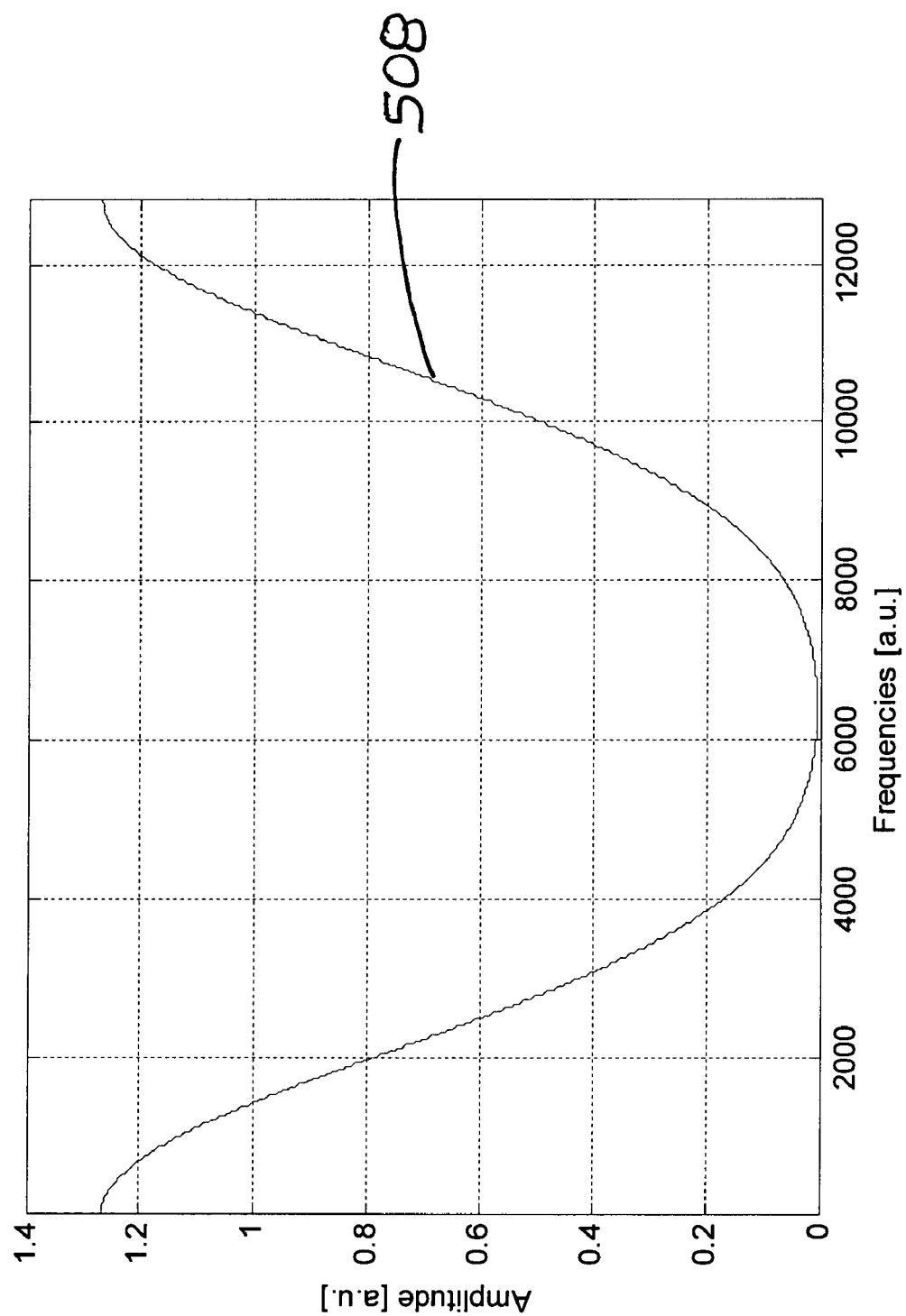
FIG. 6 shows an example of G[f] the spectrum of one interpolation function for the reverse NFFT algorithm.

Interpolation function deconvolution: The second step 506 of the reverse NFFT algorithm consists of dividing the filter corrected spectrum $Y_c[f]$ by G[f] 508, one example of which is shown in FIG. 6, the Fourier transform of the interpolation function g(t). As shown by 518 and 520, the Fourier transform G[f] 508 of the interpolation function is the fast Fourier transform of the interpolation kernel g(t) 518 and is preferably computed on the same vector length as the zero-padded filter corrected spectrum $Y_c[f]$. This vector, G[f], should be pre-computed and stored for each resolution setting. Note that it is not needed to divide the zero-padded part of the spectrum. FIG. 6 shows the spectrum of the interpolation function G[f] 508 that was implemented in one embodiment of the present invention, and FIG. 7 shows the zero-padded spectrum 504 as well as the inverse 512 of the interpolation function spectrum. It should be appreciated that the zero-padding operation of step 504 described above in "Zero-padding of the spectrum" could be applied after step 508 to the results of the division of the filter corrected spectrum Yc[f] by G[f], without modifying the result of the reverse NFFT algorithm, assuming that the computation of G[f] is not changed.

The frequencies shown for the abscissa in FIGS. 6 and 7 are in arbitrary units (a.u.) related to the position index of the samples in the vector. As shown in FIG. 7, the inverse 512 is a minimum when G[f] 508 is a maximum. The portion of the inverse 512 between zero and a frequency of 6,144 is related to the positive frequency components of the signal and the portion of the inverse between a frequency of 6,144 and about 12,288 is related to the negative frequency components of the signal. The zero values between just above a frequency of about 3,072 and a frequency of about 9,216 designated by the reference numeral 524 in FIG. 7 is due to the zero padding described above.

Inverse Fourier transform: The next step 510 of the reverse NFFT algorithm 500 is to compute the inverse fast Fourier transform (IFFT) to obtain the deconvolved time-sampled signal ($Y_g[t_i]$) 512 and thus return to the time domain. The time signal 512 is now oversampled, and the impact of the interpolation function g(t) 518 used in the next processing step 514 has been removed in advance in order to benefit from the uniform sampling of the initial time signal. As can be appreciated, the oversampling of the time signal 512 results from the zero-padding step 504, where the zero-padding factor was chosen in combination with the interpolation function to achieve the desired accuracy.

Interpolation process: Step 514 of the reverse NFFT algorithm 500 is to interpolate the oversampled time-sampled signal 512, at the times 516 corresponding to the required reference grid (datum points), which is 414 of FIG. 4, to give the interpolated signal at reference times 522, which is 418 of FIG. 4. The interpolation process is a convolution process. The time vector of the time-sampled signal does not need to be computed, especially when the reference times are expressed in units of the time sampling interval. It must be ensured that the time range of the time-sampled signal is larger than the time range of the reference times, due to the span of the interpolation function g(t) 518. In one preferred implementation of the new time sampling algorithm, the interpolation function 518 can be calculated on 11 points of the oversampled vector for each interpolated time to provide an accuracy in the order of a few parts per million (ppm) relative to the maximum value of the spectrum.

Returning now to FIG. 4, if the spectrometer is a Fourier transform type spectrometer, the fourth step 420 of this invention is to compute the spectrum 422 by the Fourier transform of the signal interpolated on the reference grid when performing the reverse NFFT algorithm, using the FFT algorithm. The spectrum may have to be truncated to remove the samples corresponding to the zero-padding of the NFFT. Extra spectral points due to the oversampling of the reverse NFFT algorithm can be dropped, taking care to remove the imaginary part of the lower negative spectral point to ensure that the corresponding interferogram is real for an even number of interpolated samples.

A setup of the invention was developed to evaluate the performance of the time-sampling approach of this invention compared to the sampling technique used in MB154 spectrometers from ABB (zero-crossing triggered acquisition). The setup used a 24-bit data acquisition card (DAQ) available from National Instrument as model NI PCI-4474 that can acquire simultaneously 4 channels up to 102 kSamples/sec. The metrology channel, the infrared channel and the sampling window of the MB154 spectrometer were acquired with the DAQ card. The 24-bit data was acquired with a PC, while the data of the spectrometer sampling system was recorded with the MB154 software. Thus, the interferograms were measured simultaneously with the two sampling techniques.

The spectrum of an open-beam interferogram was computed with the standard sampling technique. Then the spectra obtained with the time-sampled interferogram using both an inverse method and the time-sampling algorithm of the present invention were compared. The spectra are phase corrected and apodized (von Hann apodization).

Figure 8:
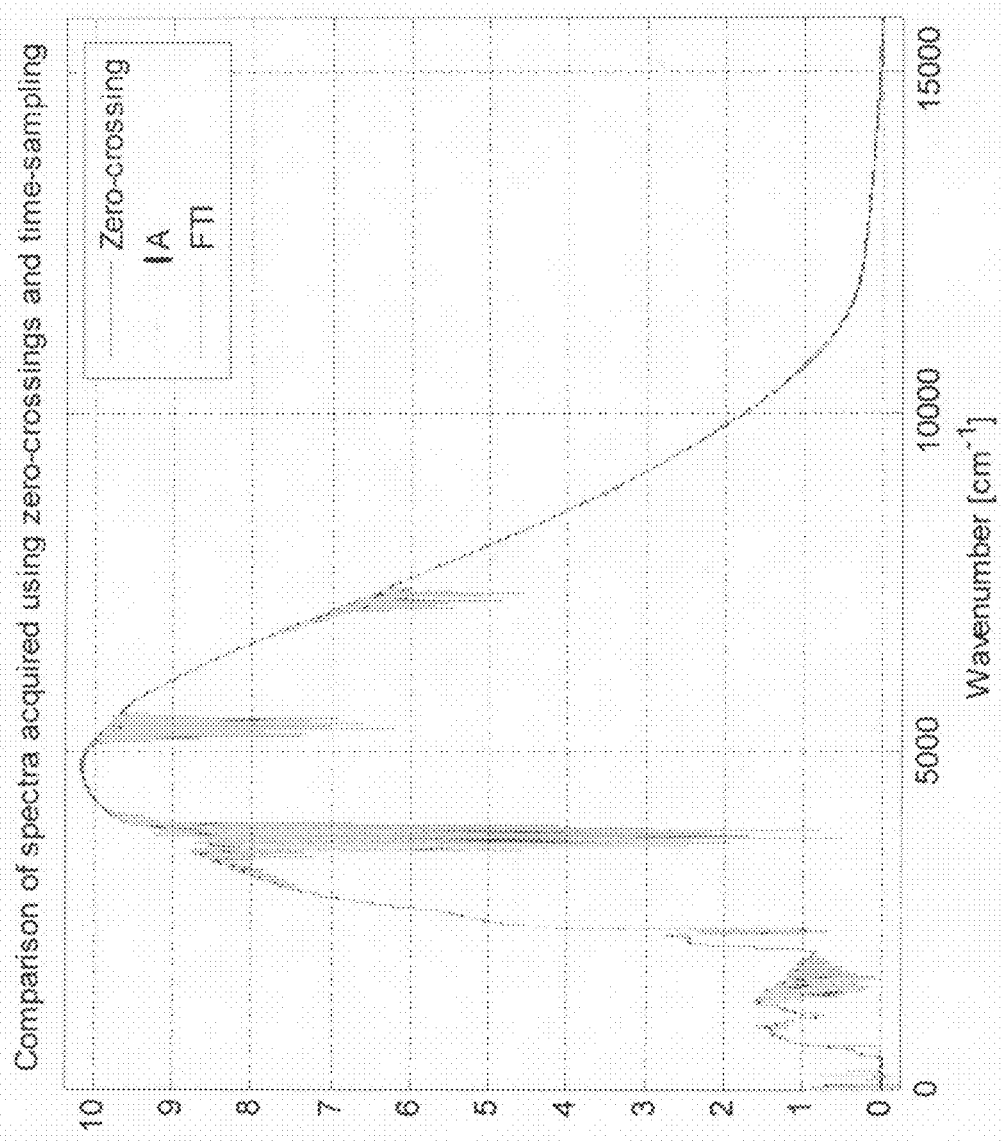
FIG. 8 shows the spectrum obtained with the zero-crossing sampling technique, and the spectra obtained with the time-sampling technique using an iterative algorithm and the time-sampling method of the present invention.
Figure 9:
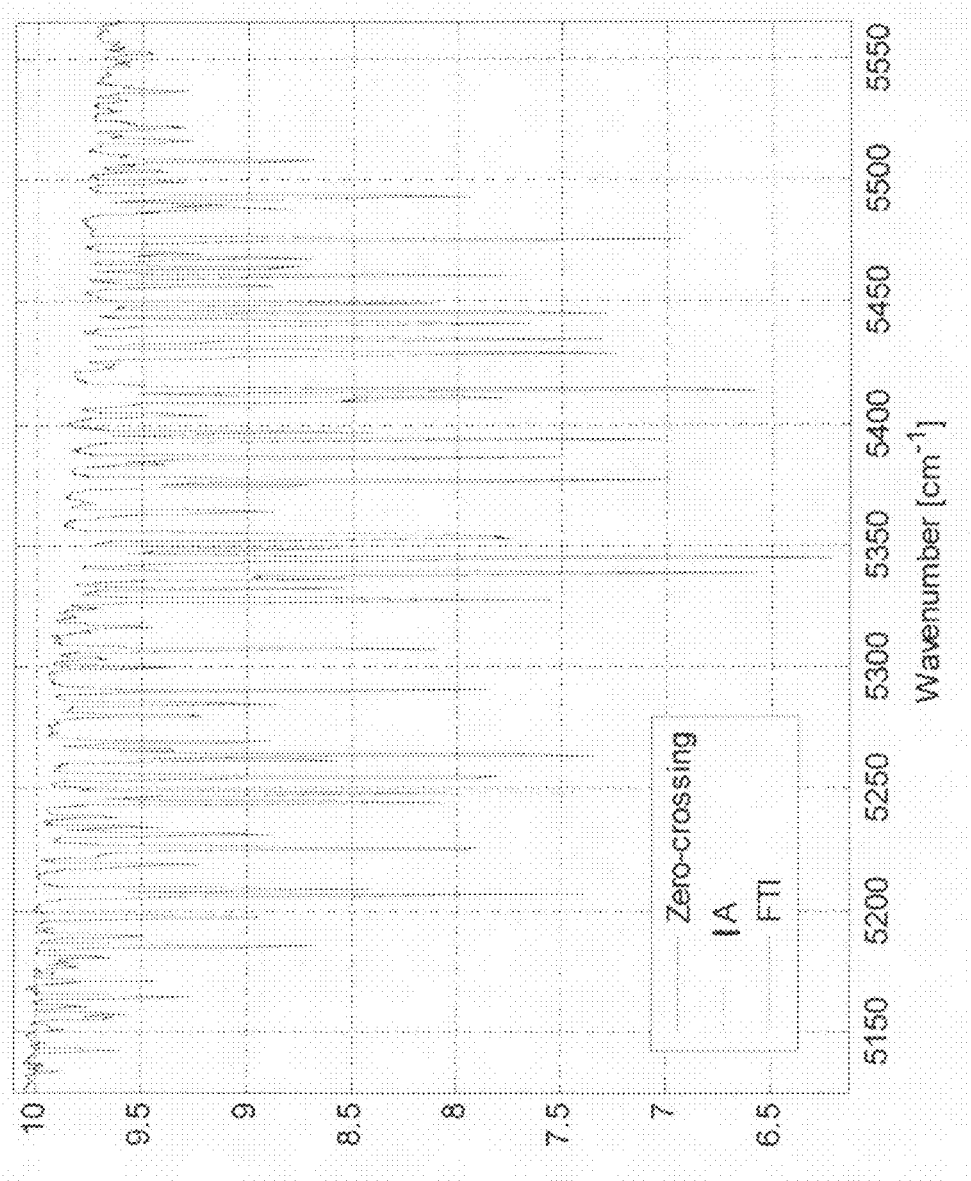
FIG. 9 shows a zoom of the spectra of FIG. 8, in a region where there are water vapor bands.

FIG. 8 and FIG. 9 show the three spectra. FIG. 9 also shows a zoom of the spectra of FIG. 8 where there are water vapor lines. All three spectra overlap. The zero-crossing triggered spectrum and the two time sampled spectra using the iterative algorithm technique (IA in the figure) and the technique of the present invention were acquired by two sampling systems: one for the zero-crossing and the other for the time sampling techniques.

Figure 10:
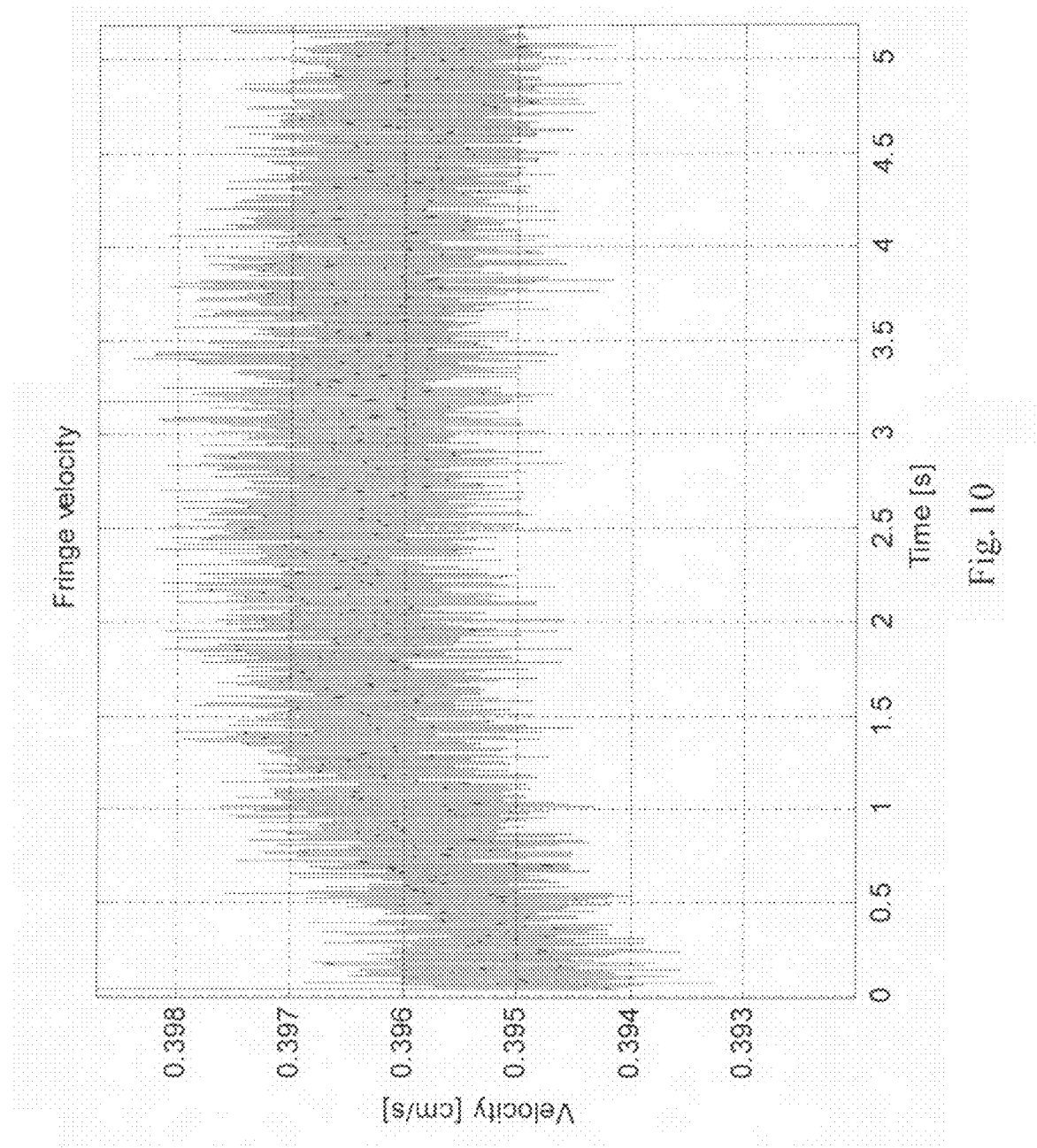
FIG. 10 shows the mirror velocity as a function of time.

FIG. 10 shows the velocity as a function of time, computed from the OPD estimate. The mean velocity corresponds to the scan speed of 0.4 cm/s set in the MB for DTGS detectors. The relative speed stability is estimated as 0.8% RMS.

Figure 11:
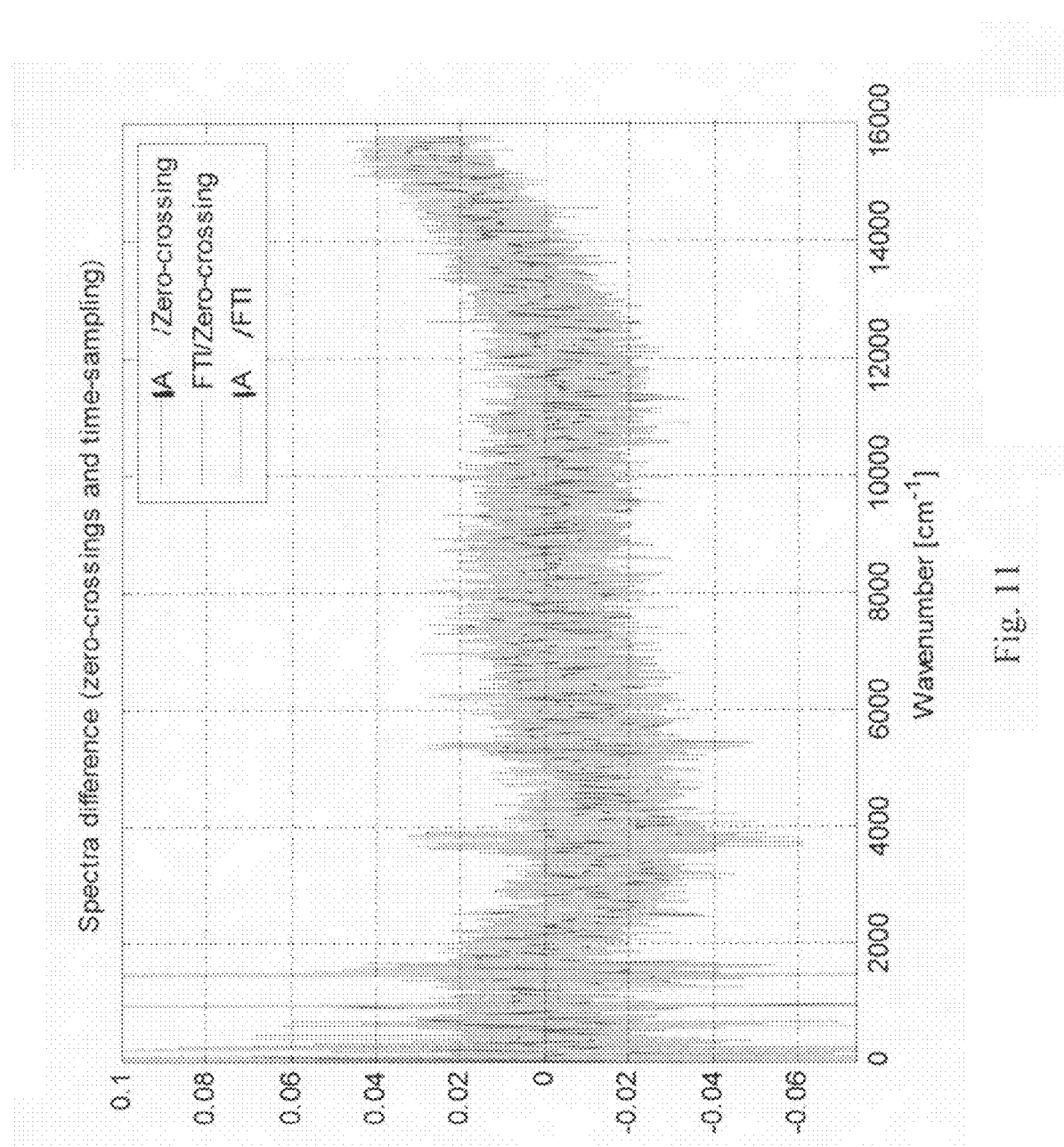
FIG. 11 shows the spectra differences between the zero-crossing sampling technique, the time-sampling technique using an iterative algorithm, and the time-sampling method of the present invention.

When the difference between the spectra obtained by the three methods are plotted, it can be seen that the difference with the zero-crossing sampling method is dominated by the noise and the filter gain mismatch (FIG. 11). The difference between the spectrum computed with an inverse method (iterative algorithm) and the invention is less than 5e-6 times the maximum value of the spectrum.

The interpolation function used in the reverse NFFT algorithm can be any window function including, but not limited to, truncated Gauss window, cosine window, Hanning window, Hanning tapered Gauss window and Kaiser-Bessel window. It can also be prolate spheroidal functions, or polynomial functions such as B-spline functions, quadratic functions or any other higher order polynomial function.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A spectrometric system comprising a spectrometer and a processing device, said spectrometer comprising:
   a primary channel providing a primary channel waveform; and
   a reference channel providing a reference channel waveform;
   said processing device adapted to process a digital representation of said primary channel waveform and a digital representation of said reference channel waveform to provide a digital output representing the primary channel waveform at datum points synchronized with the reference channel waveform, said processing device:
   computing the Fourier transform of the primary channel waveform; and using a fast reverse non-uniform discrete Fourier Transform technique to compute the reverse non-uniform discrete Fourier transform of said Fourier transform of said primary channel waveform to provide said digital output representing said primary channel waveform at datum points synchronized with the reference channel waveform.

2. The spectrometric system of claim 1 further comprising an interferometer.

3. The spectrometric system of claim 2 wherein said interferometer is a Michelson type interferometer, a Fabry-Perot type interferometer, a Mach-Zehnder type interferometer or a Martin-Puplett type interferometer.

4. The spectrometric system of claim 2 wherein said datum points synchronized with said reference channel waveform correspond to equally spaced optical path differences of said interferometer, and wherein the spectrum of said primary channel waveform is computed by performing the Fourier transform of said primary channel waveform at said datum points synchronized with said reference channel waveform.

5. The spectrometric system of claim 1 wherein said digital representation of said primary channel waveform is uniformly sampled in time and said system further comprises an analog to digital converter and a fixed frequency clock for providing said digital representation of said primary channel waveform uniformly sampled in time.

6. The spectrometric system of claim 5 wherein said analog to digital converter is a successive approximation analog-to-digital converter including a delta-sigma modulator.

7. The spectrometric system of claim 1 further comprising an analog to digital converter and a fixed frequency clock signal for providing said digital representation of said reference channel waveform.

8. The spectrometric system of claim 1 wherein said digital representation of said reference channel waveform comprises timing information synchronized with said reference channel waveform.

9. The spectrometric system of claim 8 wherein said timing information in said digital representation of said reference channel waveform comprises some or all of the zero-crossing times of said reference channel waveform.

10. The spectrometric system of claim 8 wherein said timing information in said digital representation of said reference channel waveform comprises the time intervals between some or all of the zero-crossing times of said reference channel waveform.

11. The spectrometric system of claim 8 wherein said timing information in said digital representation of said reference channel waveform comprises some or all of the times when said reference channel waveform crosses a threshold level.

12. The spectrometric system of claim 1 further comprising a spectrometer wherein said primary channel waveform is detected using a detector array.

13. The spectrometric system of claim 1 further comprising an imaging spectrometer.

14. The spectrometric system of claim 1 further comprising either a scanning monochromator spectrometer or a tunable laser spectrometer.

15. The spectrometric system of claim 1 wherein said reference channel waveform is provided by a Fabry-Perot etalon.

16. The spectrometric system of claim 1 wherein said fast reverse non-uniform discrete Fourier transform technique is performed using a reverse non-uniform fast Fourier transform (reverse NFFT) algorithm comprising:

a) dividing said Fourier transform of said primary channel waveform by the Fourier transform of an interpolation function;
b) computing the inverse Fourier transform of the result of said division; and
c) interpolating the result of computing the inverse Fourier transform of the result of said division at said datum points synchronized with said reference channel waveform, using said interpolation function.

17. The spectrometric system of claim 16 wherein said reverse NFFT algorithm further comprises adding one or more zeros to said Fourier transform of said primary channel waveform before dividing said Fourier transform of said primary channel waveform by said Fourier transform of said interpolation function.

18. The spectrometric system of claim 16, wherein said interpolation function is either a window function or a polynomial function for which said Fourier transform of said interpolation function converges rapidly.

19. The spectrometric system of claim 1 further comprising a detector having a spectral response, or said detector and one or more filters each having a spectral response, and a processing means removing said spectral response of each of said one or more filters and/or said detector by dividing said Fourier transform of said primary channel waveform by said spectral response of each of said one or more filters and/or said detector.

20. A spectrometric system comprising a spectrometer and a computing device, said spectrometer comprising:
a primary channel providing a primary channel waveform;
a reference channel providing a reference channel waveform;
said computing device having therein program code usable by said computing device for processing a digital representation of said primary channel waveform and a digital representation of said reference channel waveform to provide a digital output representing the primary channel waveform at datum points synchronized with the reference channel waveform, said program code comprising:
code configured to compute the Fourier transform of the primary channel waveform; and
code configured to use a fast reverse non-uniform discrete Fourier Transform technique to compute the reverse non-uniform discrete Fourier transform of said Fourier transform of said primary channel waveform to provide said digital output representing said primary channel waveform at datum points synchronized with the reference channel waveform.

21. The spectrometric system of claim 20 further comprising an interferometer and said datum points synchronized with said reference channel waveform correspond to equally spaced optical path differences of said interferometer, wherein said program code in said computing device further comprises code configured to compute a spectrum of said primary channel waveform by performing the Fourier transform of said primary channel waveform at said datum points synchronized with said reference channel waveform.

22. The spectrometric system of claim 20 wherein said program code in said computing device further comprises:
code configured to perform said fast reverse non-uniform discrete Fourier transform technique using a reverse non-uniform fast Fourier transform (reverse NFFT) algorithm comprising:
a) code configured to divide said Fourier transform of said primary channel waveform by the Fourier transform of an interpolation function;

b) code configured to compute the inverse Fourier transform of the result of said division; and
c) code configured to interpolate the result of computing the inverse Fourier transform of the result of said division at said datum points synchronized with said reference channel waveform, using said interpolation function.

23. The spectrometric system of claim 22 wherein said code configured to perform said fast reverse non-uniform discrete Fourier transform technique using a reverse NFFT algorithm further comprises code configured to add one or more zeros to said Fourier transform of said primary channel waveform before dividing said Fourier transform of said primary channel waveform by said Fourier transform of said interpolation function.

24. A computer product for processing a digital representation of a waveform of a primary channel of a spectrometric system and a digital representation of a waveform of a reference channel of said system to provide a digital output representing said primary waveform at datum points synchronized with said reference waveform, said computer product comprising:
  a processor;
  computer usable program code stored on a non-transitory tangible computer readable media which when executed by said processor performs computing the Fourier transform of said primary signal waveform; and
  computer usable program code stored on said non-transitory tangible computer readable media which when executed by said processor performs using a fast reverse non-uniform discrete Fourier Transform technique to compute the reverse non-uniform discrete Fourier transform of said Fourier transform of said primary signal waveform to provide said digital output representing said primary signal waveform at datum points synchronized with the reference signal waveform.

25. The computer product of claim 24 wherein said datum points synchronized with said reference signal waveform correspond to equally spaced optical path differences of an interferometer in said system, said computer product further comprises computer usable program code stored on said non-transitory tangible computer readable media which when executed by said processor performs computing a spectrum of said primary signal waveform by performing the Fourier transform of said primary signal waveform at said datum points synchronized with said reference signal waveform.

26. The computer product of claim 24 wherein said computer usable program code stored on said non-transitory tangible computer readable media further comprises:
  computer usable program code stored on said non-transitory tangible computer readable media which when executed by said processor performs said fast reverse non-uniform discrete Fourier transform technique using a reverse NFFT algorithm comprising:
  a) code stored on said non-transitory tangible computer readable media which when executed by said processor performs dividing said Fourier transform of said primary signal waveform by the Fourier transform of an interpolation function;
  b) code stored on said non-transitory tangible computer readable media which when executed by said processor performs computing the inverse Fourier transform of the result of said division; and
  c) code stored on said non-transitory tangible computer readable media which when executed by said processor performs interpolating the result of computing the inverse Fourier transform of the result of said division at said datum points synchronized with said reference signal waveform, using said interpolation function.

27. The computer product of claim 26 wherein said code stored on said non-transitory tangible computer readable media which when executed by said processor performs said fast reverse non-uniform discrete Fourier transform technique using a reverse NFFT algorithm further comprises code stored on said non-transitory tangible computer readable media which when executed by said processor performs adding one or more zeros to said Fourier transform of said primary signal waveform before dividing said Fourier transform of said primary signal waveform by said Fourier transform of said interpolation function.

* * * * *